A. A. RUTTAN.
PHOTOGRAPHIC FILM PACK.
APPLICATION FILED NOV. 21, 1917.
1,260,458.
Patented Mar. 26, 1918.
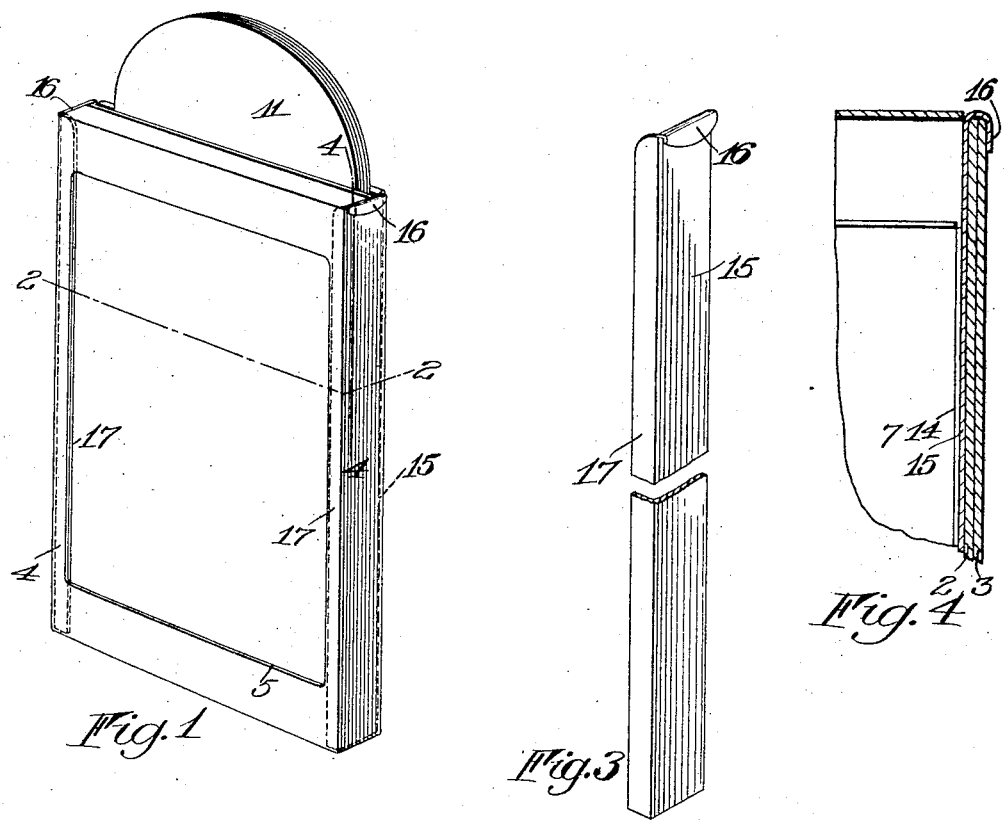
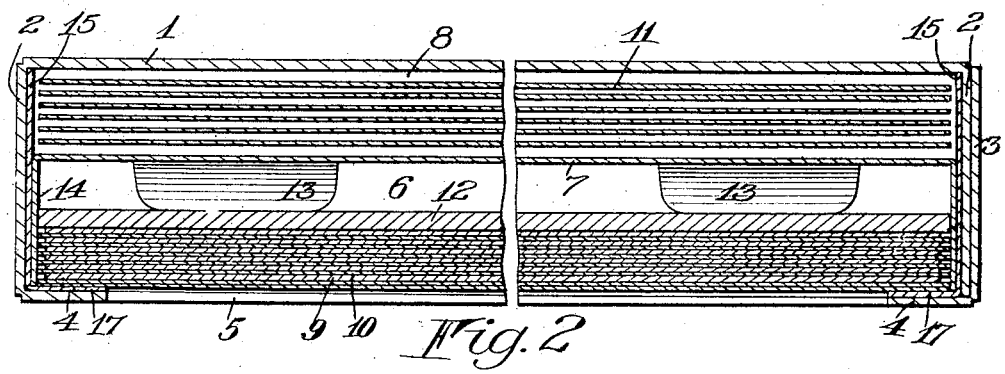
WITNESSES:
Walter Payne
George D. Powell
INVENTOR
Alfred A. Ruttan
BY
Church & Dick
his ATTORNEYS

UNITED STATES PATENT OFFICE.

ALFRED A. RUTTAN, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM PACK.

1,260,458. Specification of Letters Patent. Patented Mar. 26, 1918.

Application filed November 21, 1917. Serial No. 203,200.

*To all whom it may concern:*

Be it known that I, ALFRED A. RUTTAN, of Rochester, in the county of Monroe and State of New York, have invented certain new and useful Improvements in Photographic-Film Packs; and I do hereby declare the following to be a full, clear, and exact description of the same, reference being had to the accompanying drawing, forming a part of this specification, and to the reference-numerals marked thereon.

My present invention relates to photography and more particularly to photographic film packs employing a plurality of superposed films with manipulating tabs which films are successively drawn from an outermost position in an exposing chamber to a storage chamber. The casing or container is usually made of heavy paper or cardboard for the reason that it is cheap, light, non-abrasive, etc. It is, however, more or less pliable and capable of distortion. My invention has for its object to strengthen such a case with metal by the addition of very little material in such manner that the easy operation of the moving parts is assisted and light leaks due to the buckling of the paper covering, are prevented. To these and other ends the invention resides in certain improvements and combinations of parts all as will be hereinafter more fully described the novel features being pointed out in the claims at the end of the specification.

In the drawing:

Figure 1 is a perspective view of a film pack constructed in accordance with and illustrating one embodiment of my invention;

Fig. 2 is an enlarged sectional view thereof on the line 2—2 of Fig. 1;

Fig. 3 is a perspective view, enlarged, of one of the strengthening members detached, and Fig. 4 is an enlarged detail section taken substantially on the line 4—4 of Fig. 1.

Similar reference numerals throughout the several views indicate the same parts.

It is not believed that an extended description of the general construction of a film pack and its mode of operation is required herein. It is sufficient to say that the outer casing consists of an imperforate paper back wall 1 and side walls 2, one of which latter is overlapped at 3 by the extremity of the sheet of which they are formed. The side walls are connected by a front wall 4 that is merely a frame being cut out centrally at 5 to form the exposure opening. In rear of this opening is an exposure chamber 6 separated by a partition plate 7 from the storage chamber 8. In the exposure chamber 6 are the film sheets 9 with their protecting and carrying sheets 10 which latter are connected to tabs 11 in and projecting from the storage chamber 8 whereby the films may be drawn into this chamber after exposure. In rear of the films in the chamber 6 is a follower 12 that presses them against the front wall 4 at the margins of the exposure opening 5 under the influence of leaf springs 13 on the partitions 7. Forwardly projecting flanges 14 on the partition hold it in place and confine the follower 12.

In the practice of my invention I place against the inner face of each side wall 2 a metal strip 15 preferably coincident therewith and secured thereto by the provision of a flange or lip 16 at its end clenched over the end of the associated side wall as shown in Figs. 1 and 4. A longitudinal flange 17 turned inwardly at the front edge of each strip, lies beneath the sides of the front walls 4 up to the margin of the opening 5 and takes the thrust of the pile of films and of the spring pressed follower 12 in the exposure chamber 6.

Through the provision of these plates the angularity of the pack walls is preserved so that the casing is not easily crushed and so distorted that the follower and films within cannot move freely and accurately. Unless the outermost film closely hugs the front wall 5, light is liable to leak around it during its exposure and fog the remaining films. The flanges 17 provide a flat even surface at this point that cannot buckle as could the paper 4 to permit the entrance of light. The plates are light and add very little to the weight or cost of the article.

I claim as my invention:

1. In a photographic film pack, the combination with a paper casing having a front wall provided with an exposure opening, a partition member within the casing and films confined between the partition and the front wall, of a metallic lining plate for each side wall interposed between it and the edges of the partition member.

2. In a photographic film pack, the combination with a paper casing having a front wall provided with an exposure opening, a partition member within the casing and films confined between the partition and the front wall, of a metallic lining plate for each side wall interposed between it and the edges of the partition member, said lining plate being provided at one end with a securing flange crimped over the adjacent end of the associated side wall.

3. In a photographic film pack, the combination with a paper casing having a front wall provided with an exposure opening, a partition member within the casing and films confined between the partition and the front wall, of a metallic lining place for each side wall interposed between it and the edges of the partition member, and provided with an inwardly turned flange surrounding the exposure opening to take the thrust of the films.

ALFRED A. RUTTAN.

Witnesses:
HELEN M. FRASER,
MARGARET DUIGNAN.

Copies of this patent may be obtained for five cents each, by addressing the "Commissioner of Patents, Washington, D. C."